United States Patent
Noy et al.

(10) Patent No.: US 12,067,876 B2
(45) Date of Patent: *Aug. 20, 2024

(54) SYSTEMS AND METHODS OF HANDS-FREE ASSISTANT-REQUESTED COMMUNICATION

(71) Applicant: GOOGLE LLC, Mountain View, CA (US)

(72) Inventors: David Noy, Mountain View, CA (US); Gal Moshitch, Tel-Aviv (IL); Shachar Shimoni, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/470,765

(22) Filed: Sep. 9, 2021

(65) Prior Publication Data

US 2021/0407289 A1   Dec. 30, 2021

Related U.S. Application Data

(63) Continuation of application No. 16/646,927, filed as application No. PCT/US2017/051167 on Sep. 12, 2017, now Pat. No. 11,145,203.

(51) Int. Cl.
*H04W 4/48*     (2018.01)
*G08G 1/0967*   (2006.01)
(Continued)

(52) U.S. Cl.
CPC ... *G08G 1/09675* (2013.01); *G08G 1/096775* (2013.01); *H04W 4/023* (2013.01);
(Continued)

(58) Field of Classification Search
CPC .......... H04W 4/024; H04W 4/18; H04W 4/21
(Continued)

(56) References Cited

U.S. PATENT DOCUMENTS 6,823,184 B1   11/2004   Nelson
9,509,820 B2   11/2016   Gopinath
(Continued)

FOREIGN PATENT DOCUMENTS

EP   2 975 852 A1    1/2016
JP   2009216437 A    9/2009
(Continued)

OTHER PUBLICATIONS

International Search Report and Written Opinion for Application No. PCT/US2017/051167, dated May 14, 2018.
(Continued)

*Primary Examiner* — Joseph Arevalo
(74) *Attorney, Agent, or Firm* — MARSHALL, GERSTEIN & BORUN LLP

(57) ABSTRACT

Systems and methods are provided for establishing a hands-free communication session between a user and an electronic device. A triggering event for establishing a communication session with the user of a navigation application is detected. The triggering event may include identification, by the electronic device, of information from the data source that is desirable to communicate to the user at the present time. A level of importance of the information is determined, and a notification in accordance with the determined level of importance is generated, the notification having a first property in a first instance and a second property in a second instance. When, after generating the notification, permission from the user to establish the communication session is received, a communication session between the electronic device and the user including voice output by the electronic device and voice input by the user may be established.

19 Claims, 4 Drawing Sheets

(51) Int. Cl.
*H04W 4/02* (2018.01)
*H04W 76/14* (2018.01)

(52) U.S. Cl.
CPC ............ *H04W 4/027* (2013.01); *H04W 4/48* (2018.02); *H04W 76/14* (2018.02)

(58) Field of Classification Search
USPC ........ 455/418, 456.3, 556.1, 563, 566, 41.2, 455/404.1, 41.3, 41.1, 411
See application file for complete search history.

(56) References Cited

U.S. PATENT DOCUMENTS

| | | | |
|---|---|---|---|
| 10,176,827 B2 * | 1/2019 | Miller | G06F 16/3329 |
| 10,387,961 B1 * | 8/2019 | Burgess | G06Q 40/08 |
| 10,719,757 B2 * | 7/2020 | Fourney | G06F 16/3322 |
| 10,735,597 B1 | 8/2020 | Zagorski et al. | |
| 10,824,932 B2 * | 11/2020 | Liensberger | G06N 3/006 |
| 11,145,203 B2 | 10/2021 | Noy et al. | |
| 11,374,888 B2 * | 6/2022 | Nagaralu | H04L 51/066 |
| 2003/0065790 A1 | 4/2003 | Loveland et al. | |
| 2009/0298474 A1 | 12/2009 | George | |
| 2010/0082229 A1 | 4/2010 | Yang et al. | |
| 2010/0125410 A1 | 5/2010 | Hicks | |
| 2010/0222078 A1 | 9/2010 | Tysowski | |
| 2011/0137556 A1 | 6/2011 | Chen | |
| 2013/0077772 A1 | 3/2013 | Lichorowic et al. | |
| 2014/0278072 A1 | 9/2014 | Fino et al. | |
| 2014/0365390 A1 * | 12/2014 | Braun | H04W 4/023 705/325 |
| 2015/0143391 A1 | 5/2015 | Ozawa et al. | |
| 2015/0348548 A1 * | 12/2015 | Piernot | G10L 15/26 704/235 |
| 2016/0012194 A1 | 1/2016 | Prakash | |
| 2016/0036962 A1 | 2/2016 | Rand | |
| 2017/0177808 A1 * | 6/2017 | Irwin | G06Q 40/123 |
| 2018/0096690 A1 | 4/2018 | Mixter | |
| 2019/0130707 A1 * | 5/2019 | Gruber | G08B 3/1016 |
| 2019/0235916 A1 * | 8/2019 | Min | G06F 3/048 |
| 2019/0251541 A1 * | 8/2019 | Etzion | G06F 16/9554 |
| 2019/0335319 A1 * | 10/2019 | Li | H04W 8/18 |
| 2020/0058046 A1 * | 2/2020 | Maggio | G06Q 30/0218 |
| 2020/0211387 A1 | 7/2020 | Noy | |
| 2020/0319621 A1 * | 10/2020 | Roy | G01K 3/005 |
| 2020/0357074 A1 * | 11/2020 | Luciani | G06F 9/547 |
| 2021/0279475 A1 * | 9/2021 | Tusch | H04L 63/0861 |

FOREIGN PATENT DOCUMENTS

| | | |
|---|---|---|
| JP | 2012073076 A | 4/2012 |
| WO | WO-2015200153 A1 | 12/2015 |

OTHER PUBLICATIONS

Office Action for Chinese Application No. 201780096094.9, dated Feb. 28, 2023.

* cited by examiner

SYSTEMS AND METHODS OF HANDS-FREE ASSISTANT-REQUESTED COMMUNICATION

CROSS-REFERENCE TO RELATED APPLICATION

This application is a continuation of U.S. patent application Ser. No. 16/646,927, filed Mar. 12, 2020, which is a national stage application, filed under 35 U.S.C. § 371, of International Patent Application No. PCT/US2017/051167, filed Sep. 12, 2017, the disclosures of both of which are incorporated by reference herein in its entirety.

FIELD OF THE DISCLOSURE

This application generally relates to establishing hands-free communications between an electronic device and a user via a software assistant.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Software applications configured to receive voice commands from users and respond with voice-based communications have become popular in electronic devices. Generally speaking, voice-based communications between the electronic device and the user can be initiated either by the user initiating communication with the electronic device or by the electronic device initiating communication with the user. One problem with user-initiated communication is that the user may not always be aware that there is new or relevant information available. For example, in the context of navigation software, used by many people today to obtain directions for driving, walking, bicycling, etc., a user may not be aware that there may be a traffic accident nearby, and so may not know to initiate communication with the electronic device to ask about traffic status. On the other hand, device-initiated communication may be intrusive and may interrupt the user at inappropriate times. For instance, a user listening to the radio or talking on the phone in many cases may not want to be interrupted for device-initiated communication. Additionally, a user may prefer not to receive device-initiated communication at certain times, or for comparatively less important notifications.

SUMMARY

In one aspect, a method for establishing communication session related to navigation between a user and an electronic device is provided. The communication session comprises voice output by the electronic device and voice input by the user, and the electronic device is configured to access information from a data source. The method includes detecting, by one or more processors in the electronic device, a triggering event for establishing a communication session with a user of a navigation application, wherein the triggering event comprises identifying, by the electronic device, information from the data source that is desirable to communicate to the user at the present time; determining, by the one or more processors, a level of importance of the information; generating, by the one or more processors, a notification in accordance with the determined level of importance, including generating a notification having a first property in a first instance and generating a notification having a second property in a second instance. Additionally, the method includes, subsequently to generating the notification, receiving, by the one or more processors, a permission from the user to establish the communication session; and, in response to receiving the permission, establishing the communication session between the electronic device and the user.

In another aspect, an electronic device is provided for establishing communication sessions related to navigation with a user. The electronic device includes one or more processors and a non-transitory computer-readable memory storing instructions. The instructions, when executed by the one or more processors, cause the electronic device to detect a triggering event for establishing a communication session with a user of a navigation application, wherein the triggering event comprises identifying, by the electronic device, information from the data source that is desirable to communicate to the user at the present time; determine a level of importance of the information; generate a notification in accordance with the determined level of importance, the notification having a first property in a first instance and having a second property in a second instance; receive, subsequently to generating the notification, a permission from the user to establish the communication session; and establish, in response to receiving the permission, the communication session between the electronic device and the user.

DETAILED DESCRIPTION

Overview

Figure 1:
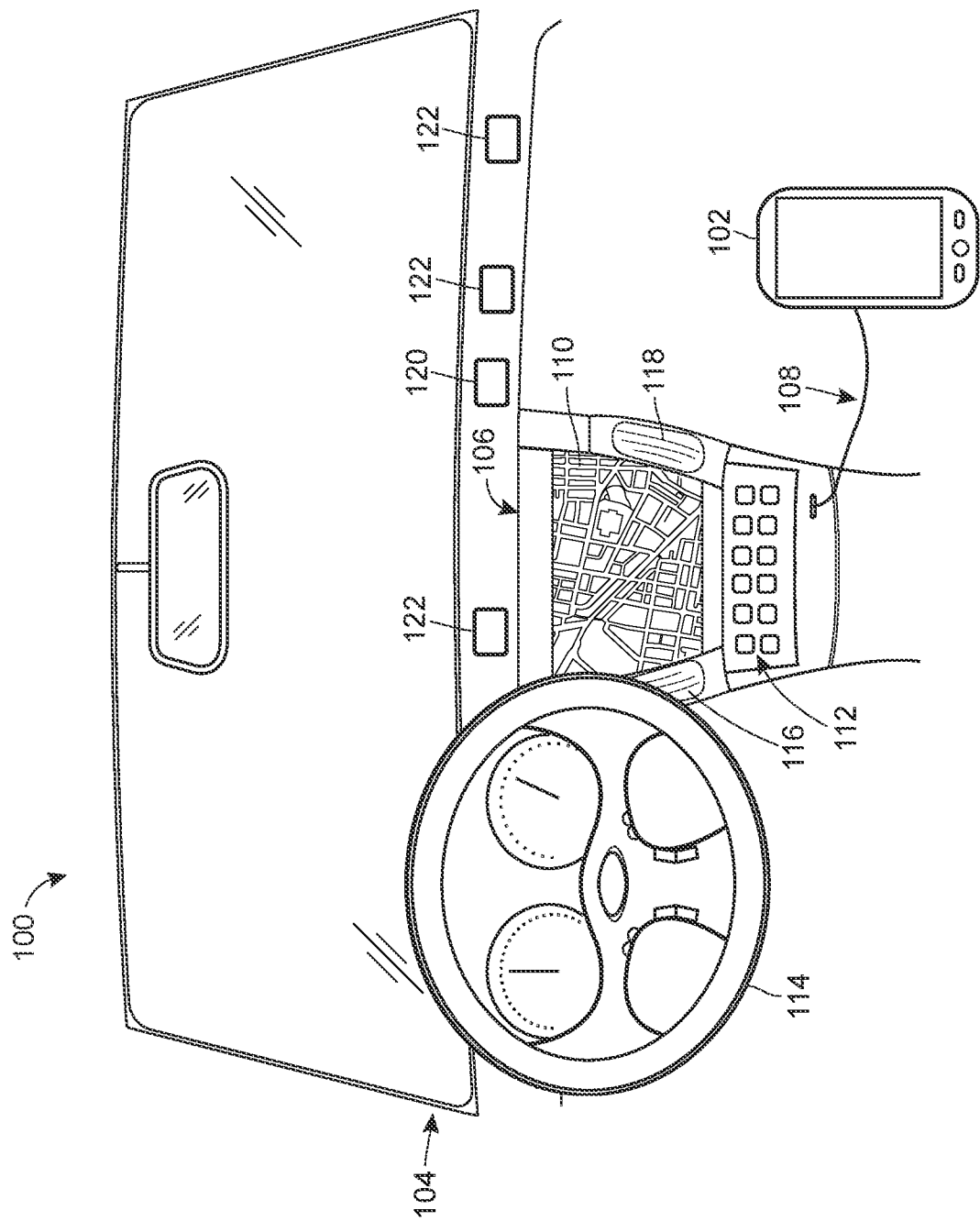
FIG. 1 illustrates an example environment in which the techniques of the present disclosure can be used for establishing a communication session related to navigation between a user and an electronic device.

In an electronic device, an application may include, or cooperate with, a virtual voice assistant configured to generate a notification when the application identifies a reason to communicate with a user of the electronic device. The identified reason, or "triggering event," can be related to information available for delivery to the user. For example, the information available for delivery to the user may be an announcement related to an upcoming appointment on the user's calendar. As another example, when the application is a navigation application, the information available for delivery to the user may be a notification of a point of interest (POI) the user is approaching. As another example, the information available for delivery to the user may be an indication that the user will likely be late to an upcoming meeting on the user's calendar (i.e., based on an estimated time of arrival). In some instances, the application may communicate with the user in order to obtain a permission to send an update (via, e.g., text, email, etc.) of the user's ETA to the other meeting attendees. The triggering event also can be related to information that the user can be expected to have and be willing to share with the application or any associated online services related to the application. For example, the application, after informing a user of a weather forecast, may determine that the user can be expected to have an update regarding the weather (e.g., whether the forecast was accurate). As another example, when the application is a navigation application, the navigation application can determine that the user just passed the location of an earlier-reported accident, and may determine that the user can be expected to have an update regarding the accident (e.g., traffic still delayed, the accident site cleared).

The voice assistant in various implementations generates the notification in the form of a flashing light, a short sound, a text display, a popup display (e.g., a takeover or banner, or other visual signal), a haptic signal (e.g., vibration), etc., or some suitable combination of two or more of these signals. Conceptually, this notification is generally similar a student raising his or her hand in class, i.e., a request for permission to speak. The user may accept or deny this request (e.g., via voice command: "Yes, go on," or "not right now," a gesture such as a tap, or by simply ignoring the notification), and the application communicates with the user only if the request is accepted, or if the information is sufficiently important to override the user's preference. In this way, the application improves the probability that the user avoids undesirable interruptions. In some instances, the notification may be a "piggyback" of a communication for which the user has already granted permission. For example, if the user has already granted permission for a navigation-related communication, the notification may be included within the navigation instruction communication. As a more specific example, the notification may say, "Continue for 10 minutes on route 101. Two messages pending from your assistant. Say "OK, go on" to hear more."

Further, the voice assistant may vary one or more parameters of the notification in view of the importance of the notification and/or context. The parameters of the notification may include the type of a signal (e.g., audio, haptic, text) and properties of the signal (e.g., volume, intensity, pitch, duration, frequency of repetition, pattern). For example, in the navigation context, the voice assistant may determine that pointing out a nearby tourist destination is a low-importance communication, whereas a nearby police vehicle or a nearby accident is a higher-importance communication. The voice assistant further may raise or lower the level of importance of the notification view of other signals such as the speed of the vehicle or whether or not the user currently is using the smartphone to conduct a phone conversation, for example. Thus, the voice assistant in a certain scenario may determine that a relatively unimportant notification regarding a landmark building along the route can be considered a more important notification in view of the relatively slow speed of the vehicle as well as the user currently not talking on the phone or listening to the radio.

The voice assistant accordingly may vary the parameters of the notification in accordance with the determined importance of the communication. The voice assistant for example may output a light signal for low-importance communication but a sound for high-importance communication. As indicated above, the voice assistant in some cases may even override or bypass the permission request and interrupt the user for a very high-importance communication (e.g., an emergency communication).

Although the examples below focus primarily on navigation, at least some of the techniques of this disclosure also can be used in other suitable computing systems. For example, the voice assistant can operate in a user's home as a virtual assistant to provide information to the user and/or solicit information or instructions from the user. Advantageously, by waiting for a user permission to provide or solicit information, the home assistant application ensures that the user is actually nearby, is paying attention, and has the intention of communicating with the assistant before the information is provided or solicited. That is, the user may not be aware of information provided by a device if the user is in another room of the home when the information is provided. Moreover, if the user is in the same room as the device, the user may be asleep, busy, inattentive, etc., or otherwise may not be inclined to communicate with the assistant at a particular time. Accordingly, the user may grant permission once the user is notices the notification and wishes to communicate.

Example Computing Environment

Referring to FIG. 1, an example environment 100 in which the techniques outlined above can be implemented includes an electronic device 102 and a vehicle 104 with a head unit 106. The electronic device 102 may be a smart phone, tablet computer, wearable computer, etc. The electronic device 102 communicates with the head unit 106 of the vehicle 104 via a communication link 108, which may be wired (e.g., Universal Serial Bus (USB)) or wireless (e.g., Bluetooth, Wi-Fi Direct). The electronic device 102 also can communicate with various content providers, servers, etc. via a wireless communication network.

In operation, the electronic device 102 provides the head unit 106 with information related to navigation, which may include digital map images, text, and audio. The head unit 106 displays this information via a display 110. The display 110 in some implementations is a touchscreen and includes a software keyboard for entering text input, which may include the name or address of a destination, point of origin, etc. Another type of the display 110 can be as a relatively sophisticated screen provided along with a non-touch input device, such as a rotary controller, for example, or a separate touch pad. In general, the display 110 need not be capable of displaying both text and images. A head unit in another vehicle can include, for example, a simple display only capable of displaying alphanumeric characters on one or several lines.

The head unit 106 can include hardware input controls such as buttons, knobs, etc. These controls can be disposed on the head unit 106 or elsewhere in the vehicle 104. For example, the vehicle 104 in FIG. 1 includes navigation controls 112 on the head unit 106 as well as steering wheel controls 114 communicatively coupled to the head unit 106. The controls 112 and 114 can be mapped to a variety of navigation control functions on the electronic device 102. The controls 112 and 114 in some implementations also can be used for entering alphanumeric characters.

The vehicle 104 can also include audio input and output components, such as a microphone 116 and a speaker 118. The microphone 116 may be configured to capture voice input from a user, while the speaker 118 may be configured to communicate navigation-related information with the user. Similar to the hardware controls 112 and 114, the microphone 116 and speaker 118 can be disposed directly on the head unit 106 or elsewhere in the vehicle 104. Additionally, the vehicle 104 can include other appropriate sensors 120, such as, for example, image sensors, which can also be disposed directly on the head unit 106 or elsewhere in the vehicle 104, and which may be configured to capture other types of input from the user (e.g., gesture commands). The vehicle 104 may also include one or more internal light indicators 122.

Of course, in some embodiments, the electronic device 102 may include some or all of the features of the head unit 106. That is, the electronic device 102 may include a display, a keyboard, hardware input controls such as buttons, knobs, etc., navigation controls, audio input and output components, various sensors, and/or lights, etc., such as those described with respect to the head unit 106. Moreover, in some embodiments, the electronic device 102 may perform some or all of the functions of the head unit 106, e.g., communicating/displaying information related to navigation, etc. Accordingly, in some embodiments an electronic device such as electronic device 102 may replace the head unit 106 described herein, i.e., some embodiments may not include a head unit at all.

Figure 2:
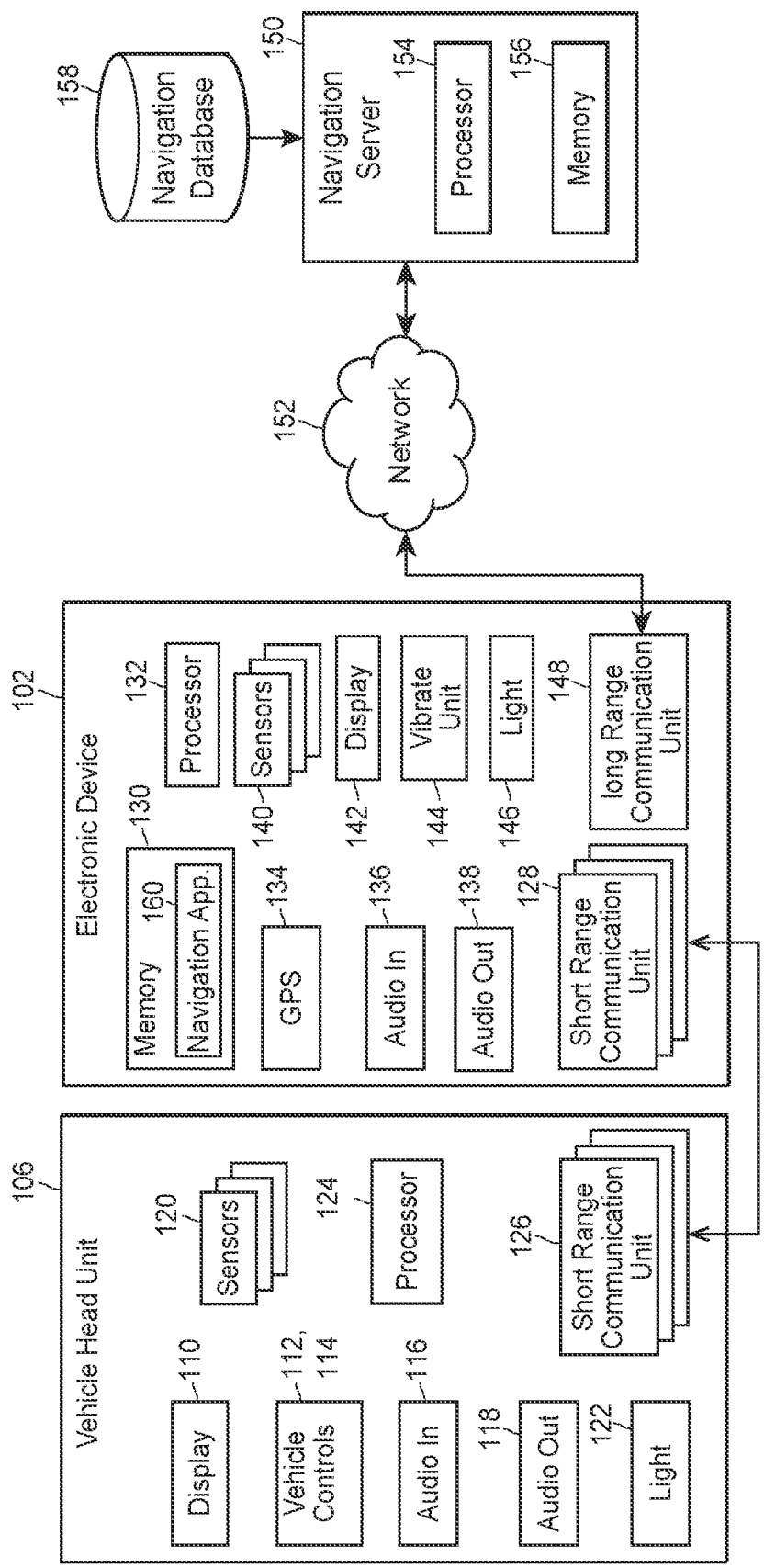
FIG. 2 is a block diagram of an example electronic device and an example head unit that can operate in the system of FIG. 1.

An example implementation of the electronic device 102 and head unit 106 is illustrated with reference to FIG. 2. As discussed above, the head unit 106 includes a display 110, hardware controls 112, 114, an audio input unit 116, and an audio output unit 118, one or more sensors 120, and an internal light 122. The head unit 106 may also include a processor 124 and one or several short-range communication units 126.

The set of sensors 120 can include, for example, a global positioning system (GPS) module to determine the current position of the vehicle in which the head unit 106 is installed, an inertial measurement unit (IMU) to measure the speed, acceleration, and current orientation of the vehicle, a barometer to determine the altitude of the vehicle, an image sensor configured to recognize responsive gestures made by a vehicle operator, etc. Although FIG. 2 depicts the set of sensors 120 inside the head unit 106, it is noted that the sensors 120 need not be integral components of the head unit 106. Rather, a vehicle can include any number of sensors in various locations, and the head unit 14 can receive data from these sensors during operation. Moreover, some or all of the sensors may be disposed at electronic device 102, or otherwise communicatively connected to the electronic device 102.

Depending on the implementation, the processor 124 can be a general-purpose processor that executes instructions stored on a computer-reader memory (not shown) or an application-specific integrated circuit (ASIC) that implements the functionality of the head unit 106. In any case, the processor 124 can operate to format, send, receive and/or process communication between the head unit 106 to the electronic device 102, display map images and/or notifications via the display 110, play audio notifications/communications via the audio output 118, etc.

A short-range communication unit 126 allows the head unit 106 to communicate with the electronic device 102. The short-range communication unit 126 may support wired or wireless communications, such as USB, Bluetooth, Wi-Fi Direct, Near Field Communication (NFC), etc. Similarly, the electronic device 102 can include a short-range communication unit 128 for communicating with the head unit 106. Similar to the short-range communication unit 126, the short-range communication unit 128 can support one or more communication schemes such as USB, Bluetooth, Wi-Fi Direct, etc.

The electronic device 102 can also include a memory 130, one or more processors 132, a positioning module such as a GPS unit 134, an audio input unit 136, and an audio output unit 138, one or more sensors 140, a display 142, a vibrate unit 144, and a light source 146 (e.g., an LED). These components may operate similarly to analogous components described as part of the head unit 106, and may in some instances be included only in the electronic device 102. Furthermore, the electronic device 102 can include a long-range communication unit 148 to transmit data to and receive data from a navigation server 150 via, e.g., a 3G cellular network, a 4G cellular network, an LTE cellular network, a Wi-Fi network, or any other suitable network 152. The navigation server 152 may include a processor 154 and a memory 156, and may be configured to access navigation-related data from one or more navigation databases 158.

Furthermore, the memory 130 can store instructions of a navigation application 160. The navigation application 160 can include compiled instructions and/or instructions in any suitable programmable language interpretable at runtime, and executes on the one or more processors 132. Generally, the navigation application generates, or receives from the navigation server 150, a route directing a driver from to the current location to a destination that the user has selected. As one example, the route can include a sequence of steps, each describing a route segment (e.g., name or number of the road, distance, travel time, speed limit) and a maneuver (e.g., left turn, merge right, proceed straight) to access the next route segment. The navigation application may also generate provide information about points of interest (POIs) along the route, as well as other information relevant to the user.

The navigation application 160 can implement a voice assistant which communicates with the user. Alternatively, the voice assistant is implemented as an independent task executing on the electronic device 102 separately from the navigation application 160. In yet another implementation, the voice assistant operates on one or more network servers. In any case, the voice assistant can communicate with the user via the audio output 118 and/or 138. For instance, the voice assistant may communicate route guidance and other navigation-related information to the user via an audio output of the electronic device 102 or of the head unit 106. The voice assistant can also request navigation-related information from the user in some instances. Moreover, the voice assistant can be responsive to inputs from the user, such as voice commands, gestures, etc. detected by, e.g., the audio inputs 116 and/or 136, or any of the other sensors 140. User inputs may include, e.g., selections or permissions of the user.

The voice assistant can attempt to establish communication sessions between the user and a certain local or remote data source. For example, the navigation server 150 and the navigation database 158 can be the data source when the information related to the triggering event originates outside the electronic device 102. The navigation database 158 can store information related to road accidents reported by other drivers or automated systems. The electronic device 102 can be configured to access data from the navigation database 158 on a periodic basis. In other cases, the electronic device 102 itself can be the data source. The navigation application 160 for example can identify an upcoming maneuver during navigation. Further, certain components operating in the head unit 106 can be the data source when, for example, the electronic device 102 and the head unit 106 are communicatively coupled, and when the head unit 102 has certain information related to the vehicle to report.

Before establishing a communication session with the user, the voice assistant can generate a non-intrusive notification configured to alert a user that the navigation application 160 has something to communicate to the user or that the navigation application 160 has a request for information from the user. The notification may be, for example, a sound signal, a light signal, a display of a certain message, a vibrational signal, etc., and may vary based on the importance of the communication and/or request for information. For example, the voice assistant can generate a louder sound or brighter light for a more important communication or request. As another example, the voice assistant can generate a sound may for a more important communication/request and a light for a less important communication/request. Upon noticing the notification, the user may use a voice command to indicate permission for the voice assistant to communicate. Accordingly, the navigation application 160 may establish a communication session with the user only once the user permission is received. Advantageously, in the navigation context, the user can grant permission via a voice command without removing his or her hands from the wheel of the vehicle.

Example Interactions with the Voice Assistant

Figure 3:
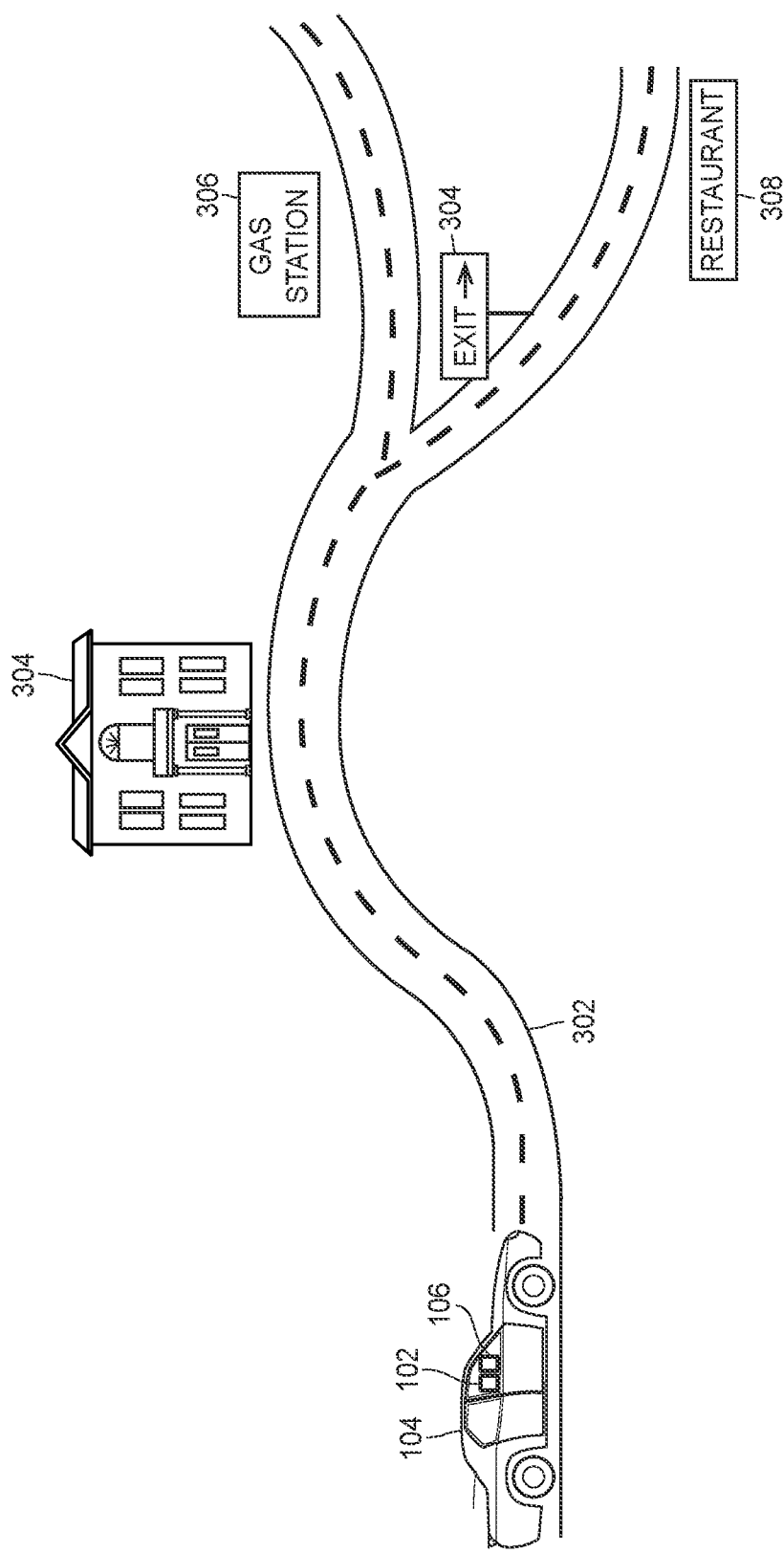
FIG. 3 illustrates an example vehicle route in which the techniques of the present disclosure can be used for establishing a communication session related to navigation between a user and an electronic device.

FIG. 3 schematically illustrates some example situations in which the techniques of the present disclosure can be used for establishing communication sessions related to navigation. In these examples, the electronic device 102 is disposed in the vehicle 104 traveling a route segment 302. The navigation application 160 generates navigation directions for guiding the driver of the vehicle 104 to a destination along a certain route including the route segment 302. This route segment establishes the current context for the navigation application 160 and the voice assistant (which may operate as a component of the navigation application 160 or as a separate application). The voice assistant may generate notifications in an attempt to establish communication with the user based on certain triggering events, in view of the established context.

The navigation application 160 may attempt to establish communications with the user in order to provide information related to the triggering event. For example, using the GPS 134 and/or information accessed from the navigation database 158, the navigation application 160 may determine that the vehicle is near (e.g., five miles away, one mile away, 100 feet away, etc.) an upcoming turn, such as exit 304. Accordingly, the navigation application 160 may generate a trigger event to establish a communication session with a user, who may be a driver or passenger of the vehicle 104, to notify her or him that the turn is approaching, and may consequently cause the voice assistant to request permission to establish the communication session. This request may be in the form of a notification with certain properties related to the type of a signal, the intensity of the intensity of the signal, etc. More particularly, based on how close the vehicle 102 is to the exit 304, the notification may indicate a greater or lesser importance. For example, when the vehicle 102 is five miles from the exit 304, the notification may indicate that the triggering event is less important, but when the vehicle 102 is only 100 feet from the exit 304, the notification may indicate that the triggering event is more important. Once the user grants permission to communicate, e.g., by voice command ("go on," "what's up?", "please speak," etc.), the navigation application 160 may establish the communication session and provide the necessary information (e.g., "Turn approaching in five miles.").

In other instances, the user may not grant permission for the navigation application 160 to establish communication at that time (e.g., no response, "please do not speak right now," "I'm busy right now," "don't interrupt me right now," etc.) Additionally, in some instances, the user may grant a delayed permission for the navigation application 160 to establish communication (e.g., "remind me in one minute," "not right now, but remind me in five minutes," etc.) The level of importance the navigation application 160 assigns to the notification may help some users to determine whether they should grant permission.

As another example, various points of interest (POIs) for the driver of the vehicle, such as a tourist site 304 (e.g., a landmark, monument, historical site, museum), a gas station 306, a restaurant 308, etc., may be disposed along or near the route segment 302. In some instances, a POI may be a pickup point (not shown to avoid clutter) for a carpool passenger, or a drop-off point (also not shown) for that passenger. Using the GPS 134 and/or information accessed from the navigation database 158, the navigation application 160 may determine the distance between the vehicle 104 and one or more POIs. The distance between the vehicle and a certain POI may be one of the signals the navigation application 160 uses to generate a notification to attempt to establish a communication session with the user. For example, when the vehicle 104 is near a pickup point for a carpool passenger, the navigation application 160 may generate a notification to attempt to establish a communication session with the user (e.g., to notify the user of the nearby passenger pickup point, to suggest that the user should call the passenger, etc.). Similarly, when the vehicle 104 is within a certain distance of the passenger's drop-off point, the navigation application 160 may generate a notification to attempt to establish a communication session with the user (e.g., to notify the user that the drop-off point is approaching, to solicit a user's rating of the passenger, etc.). As discussed with respect to the proximity to an exit or turn, the importance of the notification may be related to the proximity of the POI. For example, the notification may indicate a greater importance if the POI is 100 feet away than if the POI were 5 miles away.

Additionally, the importance indicated by the notification may be related to the type of POI. For instance, a nearby tourist site 304 may be less important than a gas station 306, particularly if the vehicle 104 is low on fuel. For example, the sensors 120 or 140 may be configured to detect fuel left in the vehicle 104. The combination of low fuel and a nearby gas station 306 accordingly may result in the navigation application 160 assigning a high (or, at least, higher) importance notification for the user. As another example, the sensors 120 or 140 may be configured to detect indications that the user may be tired. For example, the application may infer that a user is likely tired later at night or early in the morning, or after driving a certain numbers of miles in one trip, etc. The combination of signals indicative of a tired user and a nearby restaurant 308 or other location where a user can order coffee may result in the navigation application 160 assigning a high importance notification for to suggest a coffee stop to the user in some instances. More generally, the navigation application 160 can weigh any suitable number of signals when assigning a level of importance to a notification. In addition to distance (measured to the POI or the location of the next maneuver, depending on the scenario)

and signals from car sensors as discussed above, the navigation application 160 can use such example signals as (i) explicitly expressed user preferences (e.g., "warn me about tolls", "let me know where I can get some coffee"), (ii) implicitly indicated user preferences, provided the user has indicated his or her desire for the navigation application 160 to consider such preferences (e.g., coffee shops in view of the number of coffee shops the user reviewed in the past, (iii) whether the user is currently talking on the phone, (iv) whether the user currently is listening to the radio, or (v) the current noise level in the vehicle.

Once the user notices the high-importance notification, the user is more likely to grant permission to establish communication (e.g., "please speak," "go on," "what's up?"). Upon receiving permission from the user, the navigation application 160 may establish a communication session. For example, the navigation application 160 may "speak" through the speakers 118 or 138, "Fuel is low, but there is a gas station within 1 mile. Would you like me to reroute to the gas station?" The user may then respond accordingly, e.g. with a voice command "Yes, reroute," and the navigation application 160 may reroute towards the gas station 306 accordingly.

In other instances, the navigation application 160 may use the voice assistant to attempt to establish a communication session with the user in order to request, from the user, information related to the triggering event. The voice assistant may use different types of notifications for information available for the user and information potentially available from the user. For example, the voice assistant can use a green light signal for notifications related to providing information to the user, and a blue light signal for notifications related to soliciting information from the user. The user in this manner may immediately recognize the general direction of communications the voice assistant is requesting.

Both for providing information to the user and soliciting information from the user, the triggering event may be the current location of the vehicle 104. Referring back to FIG. 2, for example, the navigation server 150 may store information related to traffic and accidents in the navigation database 158. Traffic accident data in the navigation database 158 may include such information as dates and times of traffic accidents, locations of traffic accidents, severity levels of traffic accidents, etc. The navigation server 150 at some point may determine that the vehicle 104 currently is located near the site of a recently reported accident. The navigation server 150 accordingly can request that the navigation application 160 use the voice assistant to solicit information regarding this accident from the user. Accordingly, the navigation application 160 can use the voice assistant to request a communication session with the user to obtain new information regarding the accident. For example, the user may notice the notification and may grant permission to establish communication (e.g., "what's up?"). The voice assistant may in turn ask the user "Did you see the traffic accident at Main Street and State Street?" If the user confirms that he or she has seen the traffic accident, the voice assistant may ask one or more follow up questions, e.g., "Did it look bad?", "Is the road blocked?", etc., to which the user may respond by providing information to the navigation application 160 via the voice assistant, e.g., "No, it looked minor," "Yes, the road is blocked", etc. By establishing a communication session with the user, the navigation application 160 may obtain additional information and/or updated information regarding the traffic accident, and may in some instances transmit that information to the navigation server 150 via the network 152, to be added to the navigation database 158. Data from the updated navigation database 158 may be available to navigation applications in other electronic devices of other users.

As another example, the triggering event may be a change in the speed of the vehicle. For instance, the sensors 120 or 140 (one or more of which may be, e.g., speedometers or accelerometers) may be configured to detect that the vehicle has slowed down by a certain amount (e.g., a threshold number of mph, or a percentage of prior speed, etc.). Accordingly, the navigation application 160 may use the voice assistant to request a communication session with the user in order to obtain information about the reason for the slowdown. It is noted that, depending on the scenario, the navigation server 150 or the navigation application 160 can initiate an attempt to solicit information from the user. The user may notice the notification and may grant permission to establish communication (e.g., "go on."). The voice assistant may in turn ask the user "Are you slowing down because of bad traffic?" The user may, for example, confirm that is in fact the reason for slowing down, or may provide another reason. For example, the user may say "No, I am slowing down because the speed limit has changed," "no, I am slowing down because there is a police car nearby," "no, I am slowing down because I don't want to miss the exit," "no, I am slowing down because this is a construction zone," "no, I am slowing down because it is raining," etc. Based on the user's response, the navigation application 160 may ask one or more follow-up questions to obtain more information about the cause of the slowdown. Accordingly, by establishing a communication session with the user via the voice assistant, the navigation application 160 may obtain additional information and/or updated information regarding possible reasons for the vehicle slowdown, some of which may affect other users, and may in some instances transmit that information to the navigation server 150 via the network 152, to be added to the navigation database 158. Data from the updated navigation database 158 in turn may be accessed by navigation applications of other electronic devices of other users, and may provide more accurate navigation information.

Figure 4:
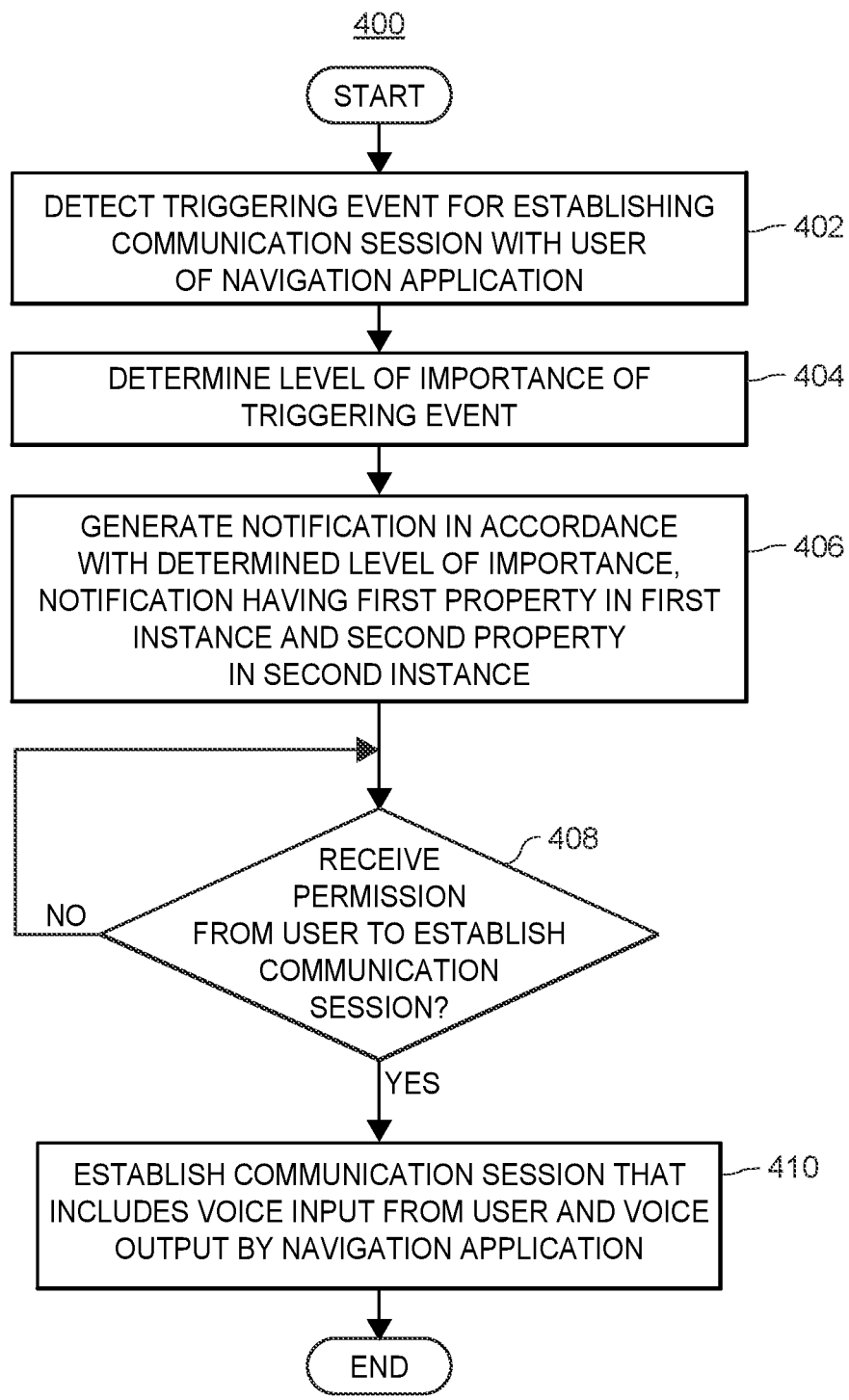
FIG. 4 is a flow diagram of an example method for establishing a communication session related to navigation between a user and an electronic device.

Now referring to FIG. 4, an example method 400 for establishing communication sessions related to navigation can be implemented in a voice assistant operating in a navigation application (e.g., the navigation application 160) or as a separate task. In any case, the method 400 can be implemented a set of instructions stored on a computer-readable memory and executable on one or more processors of the electronic device 102 or another suitable computing system. Although the example method 400 is focused primarily on navigation, in some embodiments at least some of the steps of the method 400 also can be used in other suitable computing systems. For example, the voice assistant can operate in a user's home as a virtual assistant to provide notifications to the user and/or solicit information from the user.

At block 402, a triggering event for establishing a communication session with a user of the navigation application may be detected. In some instances, detecting the triggering event may include determining that navigation information to be conveyed to the user is available. For example, the navigation information to be conveyed to the user may be an upcoming turn that the user should take. As another example, the navigation information may be information about nearby traffic congestion, or a nearby traffic accident. As still another example, the navigation information may be an indication that a faster route is available. As yet another example, the navigation information may be information about a nearby landmark.

In embodiments in which the voice assistant operates in a user's home as a virtual assistant, detecting the triggering event may include determining that home-related information to be conveyed to the user is available. For example, the virtual assistant may inform the user when there is more traffic than usual on his or her usual commuting route, and suggest an earlier departure time. As another example, the virtual assistant may inform the user that an upcoming meeting on the user's calendar has been canceled.

Additionally or alternatively, detecting the triggering event may include determining that a request for information from the user is available. For example, the triggering event may be sensor data indicating that the vehicle has slowed down, and a corresponding request for information from the user may be the question of whether the user is currently driving in traffic. As another example, the triggering event may be the determination that location of the vehicle is near a previously reported traffic accident blocking a road, and the corresponding request for information from the user may ask for an update regarding this previously reported traffic accident, e.g., whether the accident is still blocking the road.

In embodiments in which the voice assistant operates in a user's home as a virtual assistant, the triggering event may be a potential security breach, e.g., an indication that a door or window of the home has opened, and the corresponding request for information from the user may ask for an update regarding whether the door or window is actually open, and/or whether the door or window was opened by the user or not (i.e., whether there is an intruder).

As another example, when the virtual assistant is tracking the price of a stock based on a prior user request, the virtual assistant may inform the user when the stock has reached the price point the user was waiting for, and may solicit further instructions from the user regarding whether the stock should be purchased and/or sold. As another example, when the virtual assistant is performing a background operation (such as, e.g., completing an online order) based on a previous user request, the virtual assistant may inform the user that there is an update or problem that requires the user's attention, and may solicit further instructions from the user regarding whether to proceed with the order, cancel the order, etc.

At block 404, the level of importance of the triggering event may be determined. In some instances, the current geographic context of the electronic device may be determined, and the level of importance of the triggering event may be determined using the current geographic context of the electronic device. The current geographic context of the electronic device may be established using one or multiple signals such as the current location of the electronic device, the current speed of the electronic device, whether the radio is on in the car, etc. The current location of the electronic device and/or the current speed of the electronic device may be a proxy for the current location and/or speed of a vehicle in which the electronic device is disposed.

For example, the current location of the electronic device may be determined, and the level of importance of the triggering event may be determined based on the current location of the electronic device. As a more specific example, if the triggering event is related to a particular location, the distance between the current location of the electronic device and that particular location may be determined, and the level of importance of the triggering event may be based at least in part on the determined distance. For instance, the level of importance of the triggering event may be higher or greater when the distance between the current location of the electronic device and the location related to the triggering event is shorter. If the location of the electronic device is close to an upcoming exit or turn, for example, the level of importance may be higher, but if the location of the electronic device is far away from an upcoming exit or turn, the level of importance may be lower. In embodiments in which the voice assistant operates in a user's home as a virtual assistant, the level of importance of the triggering event may be based on, e.g., the time-sensitivity of the information to be provided or solicited, i.e., the time remaining until the information to be provided or solicited becomes critical.

As another example, the current speed of the electronic device may be determined, and the level of importance of the triggering event may be determined based on the current speed of the electronic device. The current speed of the electronic device may be compared to a threshold value, and determining the level of importance of the triggering event may be based on the comparison between the current speed of the electronic device and the threshold value. For example, the level of importance of the triggering event may be higher or greater when the current speed of the electronic device is greater than the threshold value. For instance, if the current speed of the electronic device is above a speed limit, the triggering event may correspond to a higher importance than if the current speed of the electronic device is below a speed limit.

At block 406, a notification may be generated in accordance with the determined level of importance. In some cases, a particular time for providing the notification may be determined based on the determined level of importance. The notification may have a first property in a first instance and a second property in a second instance. In some embodiments, the notification that has the first property may include an audio signal at a first volume, while the notification that has the second property may include an audio signal at a second volume. In some instances, the first volume may indicate a higher importance triggering event, while the second volume may indicate a lower importance triggering event. As one example, a higher volume may indicate a higher importance triggering event, while the second volume may indicate a lower importance triggering event.

Additionally or alternatively, the notification that has the first property may include an audio signal with a first sound pattern, while the notification that has the second property may include an audio signal with a second sound pattern. The sound patterns may include a beep or series of beeps, a tone or series of tones, a short melody, etc. In some instances, the first sound pattern may indicate a higher importance triggering event, while the second sound pattern may indicate a lower importance triggering event. As one example, the first sound pattern may be a series of beeps, while the second sound pattern may be a single beep.

Still additionally or alternatively, the notification that has the first property may include a first visual clue, while the notification that has the second property may include a second visual clue. The visual cues may include, e.g., a display, a light (e.g., continuous, blinking, flashing, a color or various colors, etc.). In some instances, the first visual cue may indicate a higher importance triggering event, while the second visual cue may indicate a lower importance triggering event. As one example, the first visual cue may be a red light, while the second visual cue may be a green light.

Further, the notification that has the first property may include a first vibrational signal, while the notification that has the second property may include a second vibrational signal. The vibrational signals may be, e.g., shorter or longer vibrations of the electronic device, a series of vibrations by the electronic device, etc. In some instances, the first vibrational signal may indicate a higher importance triggering event, while the second vibrational signal may indicate a lower importance triggering event. As one example, the first vibrational signal may be a longer duration of vibration while the second vibrational signal may be a shorter duration of vibration.

In some embodiments, the notification that has the first property may include one type of signal (e.g., an audio signal, a visual signal, and/or a haptic signal), while the notification that has the second property may include a different type of signal. For example, the notification that has the first property may include an audio signal while the notification that has the second property may include a visual signal. In some instances, e.g., the audio signal may indicate a triggering event with a higher level of importance, while the visual signal may indicate a triggering event with a lower level of importance.

At block 408, a query may be made as to whether permission has been received from a user to establish a communication session. If no permission is received, the flow does not proceed and remains at block 408. In some implementations, a timer may be used to determine when the voice assistant may abort the wait at block 408 and terminate the method 400. The timer may be related to the time-sensitivity of the information to be provided. For instance, if the information is related to a meeting at 4:30 p.m., the wait may be aborted after 4:30 p.m.

If permission is received, the flow proceeds to block 410, and a communication session that includes voice input from the user and voice output by the navigation application may be established. In some embodiments, establishing the communication session may include receiving voice input from the user and providing voice output via a user interface of the electronic device. Additionally or alternatively, establishing the communication session may include receiving voice input from the user and providing voice output via a head unit of a vehicle. For example, the electronic device may be communicatively coupled to the head unit via a short-range communication link.

In some implementations, establishing the communication session may include providing some information to the user via messaging or electronic mail. For example, the voice assistant can notify the user of an approaching landmark and cause the navigation application to provide detailed content in the form of a pop-up screen, a video, a text message or an email, which the user can study at a later time, etc.

In some instances, a voice command from the user may indicate that the user does not wish to establish a particular type of communication session in the future. For example, if the communication session includes an indication that the user has passed a speed limit, and the user does not wish to receive such indications, the user may request to suppress future such communication sessions. Accordingly, the next time the user passes the speed limit, no notification will be generated and no communication session will be established.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for establishing communication sessions related to navigation through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for establishing a device-initiated virtual voice assistant communication session related to navigation between a user and an electronic device, the virtual voice assistant communication session comprising voice output by the electronic device and voice input by the user, the method comprising:

detecting, by one or more processors in the electronic device, a triggering event for establishing a device-initiated virtual voice assistant communication session with a user of a navigation application, wherein the triggering event is information provided by a sensor, wherein detecting the triggering event comprises identifying, by the electronic device, one or more of: (i) first information to communicate to the user or (ii) second information from the user to communicate to the navigation application;

generating, by the one or more processors, a notification based on detecting the triggering event;

subsequently to generating the notification, receiving, by the one or more processors, a permission from the user to establish the virtual voice assistant communication session; and in response to receiving the permission, establishing the virtual voice assistant communication session between the electronic device and the user, the virtual voice assistant communication session including voice output by the electronic device including one or more of: (i) the identified first information to communicate to the user or (ii) a request for the identified second information from the user to communicate to the navigation application.

2. The method of claim 1, wherein generating the notification includes determining a time at which the notification is provided in view of a determined level of importance of the information.

3. The method of claim 1, further comprising:
determining a level of importance of the information by one or more of: determining a current noise level of an area proximate the electronic device or determining whether the user is currently using an audio feature of the electronic device that is distinct from the virtual voice assistant communication session.

4. The method of claim 1, wherein determining the level of importance of the information includes:
determining a current geographic context of the electronic device, and
using the determined current geographic context of the electronic device to determine the level of importance of the information.

5. The method of claim 4, wherein determining the current geographic context of the electronic device includes determining a current location of the electronic device, and further comprising determining a level of importance of the information by determining a distance between the current location of the electronic device and a location to which the information relates.

6. The method of claim 4, wherein determining the current geographic context of the electronic device includes determining a current speed of the electronic device, and further comprising determining a level of importance of the information by comparing the determined current speed of the electronic device to a threshold value.

7. The method of claim 1, wherein detecting the triggering event includes determining that navigation information to be conveyed to the user is available.

8. The method of claim 1, wherein detecting the triggering event includes determining whether a user is expected to have an update regarding one or more of traffic conditions or weather conditions, and wherein establishing the virtual voice assistant communication session between the electronic device and the user includes requesting an update, from the user, regarding one or more of the traffic conditions or the weather conditions.

9. The method of claim 1, wherein establishing the virtual voice assistant communication session includes at least one of receiving voice input from the user and providing voice output via a head unit of a vehicle, wherein the electronic device is communicatively coupled to the head unit of the vehicle via a short-range communication link.

10. An electronic device comprising: one or more processors and a non-transitory computer-readable memory storing thereon instructions that, when executed by the one or more processors, cause the electronic device to:
detect a triggering event for establishing a device-initiated virtual voice assistant communication session related to navigation with a user of a navigation application, wherein the triggering event is information provided by a sensor by identifying one or more of: (i) first information to communicate to the user or (ii) second information from the user to communicate to the navigation application; generate a notification based on the triggering event; subsequently to generating the notification, receive a permission from the user to establish the virtual voice assistant communication session; and in response to receiving the permission, establish the virtual voice assistant communication session between the electronic device and the user, the virtual voice assistant communication session comprising voice output by the electronic device and voice input by the user, the virtual voice assistant communication session including voice output by the electronic device including one or more of: (i) the identified first information to communicate to the user or (ii) a request for the identified second information from the user to communicate to the navigation application.

11. The electronic device of claim 10, wherein the instructions further cause the electronic device to generate the notification in accordance with a determined level of importance by determining a time at which the notification is provided in view of the determined level of importance.

12. The electronic device of claim 10, wherein the instructions further cause the electronic device to determine a level of importance of the information by one or more of: determining a current noise level of an area proximate the electronic device, or determining whether the user is currently using an audio feature of the electronic device that is distinct from the virtual voice assistant communication session.

13. The electronic device of claim 10, wherein the instructions further cause the electronic device to determine a level of importance of the information by:
determining a current geographic context of the electronic device, and
using the determined current geographic context of the electronic device to determine the level of importance of the information.

14. The electronic device of claim 13, wherein the instructions cause the electronic device to determine the current geographic context of the electronic device by determining a current location of the electronic device, and wherein the instructions further cause the electronic device to determine a level of importance of the information by determining a distance between the current location of the electronic device and a location to which the information relates.

15. The electronic device of claim 13, wherein the instructions cause the electronic device to determine the current geographic context of the electronic device by determining a current speed of the electronic device, and wherein the instructions further cause the electronic device to determine a level of importance of the information by comparing the determined current speed of the electronic device to a threshold value.

16. The electronic device of claim 10, wherein the instructions cause the electronic device to detect the triggering event by determining that navigation information to be conveyed to the user is available.

17. The electronic device of claim 10, wherein the instructions cause the electronic device to detect the triggering event by determining whether a user is expected to have an update regarding one or more of traffic conditions or weather conditions, and wherein the instructions cause the electronic device to establish the virtual voice assistant communication session between the electronic device and the user by requesting an update, from the user, regarding one or more of the traffic conditions or the weather conditions.

18. The electronic device of claim 10, wherein the instructions cause the electronic device to establish the virtual voice assistant communication session by at least one of receiving voice input from the user and providing voice output via a head unit of a vehicle, wherein the electronic device is communicatively coupled to the head unit of the vehicle via a short-range communication link.

19. The electronic device of claim 10, wherein the instructions cause the electronic device to generate the notification in accordance with a determined level of importance, including generating a notification having a first property in a first instance and generating a notification having a second property in a second instance.

* * * * *